(12) United States Patent
Campbell

(10) Patent No.: US 8,771,578 B2
(45) Date of Patent: Jul. 8, 2014

(54) ACIDIFIED POLYAMIDOAMINE ADHESIVES, METHOD OF MANUFACTURE, AND USE FOR CREPING AND PLY BOND APPLICATIONS

(75) Inventor: Clayton J. Campbell, Downingtown, PA (US)

(73) Assignee: Kemira Chemicals, Inc.

( * ) Notice: Subject to any disclaimer, the term of this patent is extended or adjusted under 35 U.S.C. 154(b) by 20 days.

(21) Appl. No.: 13/117,202

(22) Filed: May 27, 2011

(65) Prior Publication Data

US 2011/0220308 A1 Sep. 15, 2011

Related U.S. Application Data

(62) Division of application No. 12/104,791, filed on Apr. 17, 2008, now abandoned.

(60) Provisional application No. 60/912,225, filed on Apr. 17, 2007.

(51) Int. Cl.
| | | |
|---|---|---|
| *B31F 1/12* | (2006.01) | |
| *D21H 11/00* | (2006.01) | |
| *D21H 13/00* | (2006.01) | |
| *D21H 15/00* | (2006.01) | |
| *D21H 17/00* | (2006.01) | |
| *D21H 21/00* | (2006.01) | |
| *D21H 23/00* | (2006.01) | |
| *D21H 25/00* | (2006.01) | |
| *D21H 27/00* | (2006.01) | |
| *B31F 1/14* | (2006.01) | |

(52) U.S. Cl.
USPC ............................ 264/283; 162/111; 264/282

(58) Field of Classification Search
USPC .................... 162/111; 161/111; 264/282, 283
See application file for complete search history.

(56) References Cited

U.S. PATENT DOCUMENTS

| | | |
|---|---|---|
| 79,579 A | 7/1868 | Lamson |
| 2,926,116 A | 2/1960 | Keim |
| 3,058,873 A | 10/1962 | Keim et al. |
| 3,311,594 A | 3/1967 | Earle, Jr. |
| 3,414,459 A | 12/1968 | Wells |
| 3,556,907 A | 1/1971 | Nystrand |
| 3,640,841 A | 2/1972 | Winslow et al. |
| 3,772,076 A | 11/1973 | Keim |
| 4,250,299 A | 2/1981 | Lehmann et al. |
| 4,421,602 A | 12/1983 | Brunnmueller et al. |
| 4,450,045 A | 5/1984 | Hertel et al. |
| 4,487,884 A | 12/1984 | Maslanka |
| 4,501,640 A | 2/1985 | Soerens |
| 4,528,316 A | 7/1985 | Sorens |
| 4,623,699 A | 11/1986 | Brunnmueller et al. |
| 4,689,374 A | 8/1987 | Hansson et al. |
| 4,714,736 A | 12/1987 | Juhl et al. |
| 4,808,683 A | 2/1989 | Itagaki et al. |
| 4,853,431 A | 8/1989 | Miller |
| 4,880,497 A | 11/1989 | Pfohl et al. |
| 4,886,579 A | 12/1989 | Clark et al. |
| 4,952,686 A | 8/1990 | Renn et al. |
| 5,137,715 A | 8/1992 | Hoshowski et al. |
| 5,246,544 A | 9/1993 | Hollenberg et al. |
| 5,269,942 A | 12/1993 | Harrington, IV et al. |
| 5,294,475 A | 3/1994 | McNeil |
| 5,382,323 A | 1/1995 | Furman, Jr. et al. |
| 5,466,318 A | 11/1995 | Bjork |
| 5,476,594 A | 12/1995 | Collins et al. |
| 5,573,675 A | 11/1996 | Sommese et al. |
| 5,660,687 A | 8/1997 | Allen et al. |
| 5,786,429 A | 7/1998 | Allen |
| 5,902,862 A | 5/1999 | Allen |
| 5,990,333 A | 11/1999 | Allen et al. |
| 5,994,449 A | 11/1999 | Maslanka |
| 6,136,422 A | 10/2000 | Lichtenberg et al. |

(Continued)

FOREIGN PATENT DOCUMENTS

| | | |
|---|---|---|
| CA | 2110366 | 7/1994 |
| EP | 0264649 A1 | 4/1988 |

(Continued)

OTHER PUBLICATIONS

Office Action—Non-Final for U.S. Appl. No. 12/104,791, filed Apr. 17, 2008; First Named Inventor: Clayton J. Campbell; Mail Date: Jan. 6, 2011.
Office Action—Restriction Election for U.S. Appl. No. 12/104,791, filed Apr. 17, 2008; First Named Invetnor: Clayton J. Campbell; Mail Date Sep. 30, 2010.
PCTUS2008060584 International Preliminary Report on Patentability mailed Oct. 29, 2009.
PCTUS2008060584 International Search Report dated Mar. 9, 2008.
PCTUS2008060584 Written Opinion of the International Search Authority mailed Mar. 9, 2008, (6 pgs.).

*Primary Examiner* — Melissa Rioja
(74) *Attorney, Agent, or Firm* — Thomas Horstemeyer, LLP

(57) ABSTRACT

A paper adhesive composition includes a cationic non-crosslinked acidified solution of a polyamidoamine with the repeating units

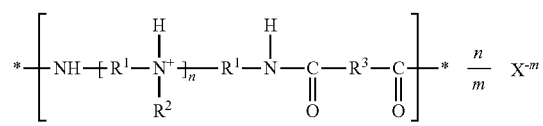

wherein $n \geq 1$; $m=1$ or 2; $X^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate, or a combination comprising at least one of the foregoing anions; $R^1$ is a divalent aliphatic, cycloaliphatic, or araliphatic group having from 1 to 24 carbon atoms; $R^2$ is hydrogen or a monovalent aliphatic, cycloaliphatic, or araliphatic group having from 1 to 24 carbon atoms; and $R^3$ is a divalent hydrocarbon radical derived from a dibasic carboxylic acid. Also disclosed are methods of creping paper with the composition.

6 Claims, 1 Drawing Sheet

(56) References Cited

U.S. PATENT DOCUMENTS

| | | |
|---|---|---|
| 6,187,138 B1 | 2/2001 | Neal et al. |
| 6,207,011 B1 | 3/2001 | Luu et al. |
| 6,214,932 B1 | 4/2001 | Maslanka |
| 6,273,998 B1 | 8/2001 | Kuo et al. |
| 6,277,242 B1 | 8/2001 | Archer et al. |
| 6,336,995 B1 | 1/2002 | Campbell |
| 6,352,613 B1 | 3/2002 | Maslanka |
| 6,689,250 B1 * | 2/2004 | Luu et al. ............ 162/111 |
| 6,908,983 B2 | 6/2005 | Maslanka |
| 7,303,652 B2 | 12/2007 | Riehle et al. |
| 7,959,761 B2 * | 6/2011 | Boettcher et al. ............ 162/111 |
| 2004/0118540 A1 | 6/2004 | Garnier et al. |
| 2004/0211534 A1 | 10/2004 | Clungeon et al. |
| 2005/0006040 A1 * | 1/2005 | Boettcher et al. ............ 162/111 |
| 2005/0222377 A1 * | 10/2005 | Wei et al. ............ 528/310 |
| 2005/0245669 A1 | 11/2005 | Clungeon et al. |
| 2006/0142431 A1 | 6/2006 | Sutman et al. |
| 2007/0151684 A1 | 7/2007 | Grigoriev et al. |
| 2007/0224146 A1 | 9/2007 | Keiser et al. |
| 2008/0255320 A1 * | 10/2008 | Allen ............ 525/430 |
| 2010/0122785 A1 * | 5/2010 | Grigoriev et al. ............ 162/111 |

FOREIGN PATENT DOCUMENTS

| | | |
|---|---|---|
| GB | 1082917 | 9/1967 |
| JP | 5806779 A | 4/1983 |
| JP | 61009352 A | 1/1986 |
| WO | WO2005059251 A1 | 6/2005 |

* cited by examiner

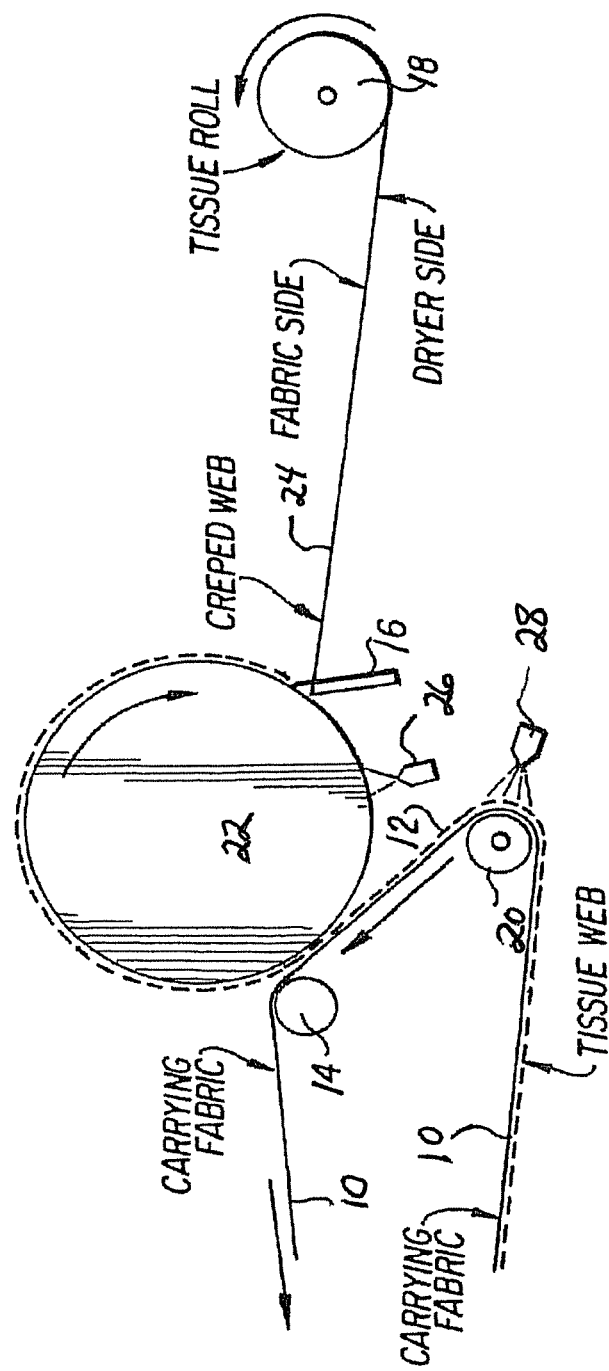

ACIDIFIED POLYAMIDOAMINE ADHESIVES, METHOD OF MANUFACTURE, AND USE FOR CREPING AND PLY BOND APPLICATIONS

CROSS-REFERENCE TO RELATED APPLICATIONS

This application is a divisional application of U.S. patent application Ser. No. 12/104,791; filed on Apr. 17, 2008 which claims the benefit of priority to legally related U.S. Provisional Patent Application Ser. No. 60/912,225 filed Apr. 17, 2007, which are fully incorporated herein by reference.

BACKGROUND

This disclosure relates to acidified polyamidoamine adhesive compositions, methods for their manufacture, and their use in creping and ply bonding applications.

In the manufacture of certain wet-laid paper products, such as facial tissue, bathroom tissue, napkins, or paper towels, the web is conventionally subjected to a creping process in order to give it desirable textural characteristics, such as softness stretch and bulk. The creping process involves adhering the web to a rotating creping cylinder, such as a Yankee dryer, and then dislodging the adhered web with a doctor blade. The impact of the web against the doctor blade ruptures some of the fiber-to-fiber bonds within the web and causes the web to wrinkle or pucker causing a formation of microfolds "crepe bars".

The severity of this creping action is dependent upon a number of factors, including the degree of adhesion between the web and the surface of the creping cylinder. Greater adhesion increases softness, although generally with some loss of strength. In order to increase adhesion, an adhesive creping aid is used to enhance any naturally occurring adhesion that the web may have due to its water-content. Water content can vary widely, depending on the extent to which the web has been previously dried. Adhesive creping aids prevent wear of the dryer surface, provide lubrication between the doctor blade and the dryer surfaces, reduce chemical corrosion, and control the extent of creping. The creping process can be wet or dry.

In either the wet or dry crepe manufacturing process, crepe adhesives can be either "soft" or "hard" polymers. Soft polymers are typically non-crosslinked polymers. Two known soft polymer adhesives are polyamines and polyvinyl alcohol (PVOH). Examples include BBD 2071, a polyamine commercially available from Buckman Laboratories International, Inc., and Airvol®, a polyvinyl alcohol sold by Air Products and Chemicals, Inc. Both materials are non-crosslinked and provide high adhesion, and are considered highly moisture sensitive. These are used to fabricate low sheet moisture grade tissues such as bath tissue on TAD (Thru Air Dryer) processes. Premium quality bath and facial tissue (<4.0% sheet moisture) are fabricated on dry crepe processes. Disadvantages of these adhesives are that they dissolve easily (slight to no insolubility); they tend to associate with the sheet and the moisture in the sheet because they are not crosslinked; they have an uneven dryer coating profile; they have fair to poor Yankee dryer and blade protection (low add-on due to high adhesion); and some are corrosive, including PVOH.

Hard polymers are typically crosslinked. The level of crosslinking in commercial hard creping adhesive products ranges from slight to high. Useful hard creping aids include epi-polyamides, which are thermoset resins (i.e. polymers that lose solubility and fusibility upon crosslinking). They provide an adhesive coating durable enough to withstand the mechanical forces at the doctor blade under conditions of heat and/or moisture. Epi-polyamides are derived from the crosslinking of polyamidoamines with epihalohydrins. Polyamidoamines themselves are condensation polymerization products formed by the reaction of a dicarboxylic acid and a polyamine having at least two primary amines and either a secondary or tertiary amine. Polyamidoamines are manufactured in an alkaline environment (pH 8.0-10.0). The pH is typically reduced to 3.0-5.0 prior to or after the addition of the epihalohydrin. Maintaining a low pH slows the crosslinking reaction and maintains product viscosity. As the pH is increased the product crosslinks, viscosity significantly increases and the product can become unstable, resulting in gellation.

While suitable for their intended purposes, crosslinked adhesives also have certain disadvantages. They tend to build up on the dryer surface, which pushes the blade back and causes sheet picking. They are ineffective on virgin fiber grades (low sheet moisture) that require high adhesion and better rewet. They also accumulate on dryer edges (the hottest section of the dryer), causing uneven profile and/or sheet breaks. The harder the base coating, the more that can build up and increase the z-directional coating thickness. Ideally, a balanced equilibrium should be established that the crepe chemical add-on, sheet fines and filler that come from the sheet equals the amount of coating that is scraped and washed off the dryer surface.

With very high coating hardness (typically on the dryer surface edges where the dryer surface temperatures is the highest), a bevel blade (5, 10 or 15° angle) at increased blade holder pressure is more effective in scraping off the buildup. The use of a bevel blade on bath tissue grades, however, can also have negative effects (such as lower bulk, bare spots on the dryer and excessive blade and dryer wear. Changing the bevel angle and increasing pressure can result in low sheet bulk, requiring lower sheet moisture of 3.0 to 3.5% (much lower then desired) in order to recover some bulk. Lower sheet moisture can require higher Yankee steam (higher dryer surface temperature) exacerbating the problem by further hardening the adhesive.

Some tissue machines utilize a separate cleaning blade located after the doctor blade and before the crepe spray boom system. The cleaning blade is typically set at a pressure from 69 to 276 megapascals (MPa) (10 to 40 pounds per square inch (psi)) and designed to remove the excess coating buildup peaks, providing improved overall surface coating profile.

Limitations also arise in connection with use of the Yankee dryer crepe spray boom configuration. First, the newly applied crepe adhesive starts crosslinking and setting on the Yankee dryer surface shortly after emerging from the spray boom. The setting rate of the adhesive depends on the dryer type, temperature, speed, sheet moisture, and pH. Sometimes, debunizers (steam box prior to the vacuum pressure roll) or infrared heater are used for additional sheet drying and can affect the coating drying rate. In most processes, there is no available space to move the spray boom closer to the blade holder to improve the adhesive's setting time. If an insufficient coating base is present, an adhesive that has a higher degree of crosslinking is used.

Second, the spray boom dilution water rewets the existing coating base that remained on the dryer. As the coating base swells and softens, the adhesive is retackified, allowing the sheet to properly transfer from the vacuum pressure roll to the dryer surface. There are occasions when a heavily crosslinked adhesive can not be sufficiently rewetted and softened and the Z directional coating thickness builds up causing operational problems.

Other drawbacks are associated with water-soluble, thermosetting cationic epi-polyamide resins. The physical properties of these resins, such as insolubility, rewet, adhesion, and hardness, are in large measure controlled by the degree of cross-linking by the epihalohydrin. It is very difficult to vary these properties for a given creping machine. Paper makers have recognized that the different creping machines and different wood pulps have different properties with the contemporaneous need for changing the properties of the creping adhesive to optimize the creping process. Paper makers have long wanted the ability to control and change the amount of cross-linking to achieve the precise performance characteristics desired for a given papermaking line to optimize the creping process. With the water-soluble, thermosetting cationic epi-polyamide resins of the prior art, that degree of control has been difficult to achieve because the cross-linking of the adhesive occurs during the manufacturing process and it is impractical to have a number of water-soluble, thermosetting cationic epi-polyamide resins with different degrees of cross-linking in an attempt to tailor the creping adhesive to the creping process.

Other adhesive deficiencies relate to plied tissue products. Laminating multiple layers, or plies, of tissue, makes various tissue products. The plies must be bonded to prevent them from delaminating or floating apart when they are converted into the final product or when they are used by the consumer.

Ply bond properties vary with paper grades and machine conditions (i.e., double layer sheets using two head boxes, multi-cylinder machines making board and napkin/towel bonding of two or more plies). Starch and latex polymer are typically used as ply bonding agents. Starch is unstable and typically requires cooking and make down dilution, and exhibits sporadic performance. Latex can have repulpability and nozzle plugging issues.

Ply bonding of the individual tissue sheets into multi-ply layers is usually achieved by embossing them on converting equipment without applying adhesive. In this process, two or more tissue webs are simultaneously unwound and fed through a nip formed between male and female embossing rolls to emboss or crimp the webs and thereby bond them together. Often in making such products as napkins, the webs are embossed only around the perimeter of areas that will be cut into the individual napkins. In a different process, tissue plies are adhered using a chemical adhesive rather than by embossing.

Controlling ply bonding is important and difficult. Inadequate, excessive, or inconsistent ply bonding can jam complex, high-speed machinery, generate high waste, and provide unacceptable product. The strength of bonding by embossing (without adhesive) may vary depending, among other things, on water content or dryness of tissue webs, and on ambient air humidity. While bonding by embossing sometimes can be improved by increasing the pressure on the embossing rolls, such pressure can wear out the embossing rolls more quickly, particularly the female roll, which is usually a softer roll made of composite material onto which a pattern is impressed by the opposing, male, engraved metal roll. In addition, the journals and bearings of both embossing rolls can also wear out prematurely if subjected to increased pressure over a prolonged period.

Creping adhesives overcome some of the problems of embossing, but they also cause problems, such as "through bonding" or "blocking", in which adjacent laminates bond to one another, and, prevent unwinding of the laminate product from its roll. Non-uniformity of bonding also causes problems, such as wrinkling of the tissue and bad printing.

Another product requirement in ply bonding is wet strength, the resistance to tearing or pulling apart while wet, which can be critically important to high quality paper napkins. Low wet strength napkins may pull apart when subjected to moisture, such as spilled liquid or a wet glass, rendering them unsatisfactory for the high quality markets. Chemicals normally employed to impart wet strength (e.g., urea, phenol-formaldehyde) can reduce ply bond-strength and can make the napkin stiffer.

Floating plies at the printing stage cause jams, high waste and machine downtime. In addition, the application of the ink causes the top layer of the tissue to expand if the plies are not well bonded, resulting in wrinkling, badly printed napkins, and extremely high costs from waste.

Commonly used ply bonding adhesives are aqueous mixtures, for example, carboxymethyl cellulose, polyvinyl alcohol, or starch. The spraying process control described above enables the use of higher (for example at least 13%) solids in the liquid adhesive, which in turn results in shorter drying times. After the adhesive is applied, the webs may be forced together by a pair of rolls (e.g. calendar rolls) that are in contact as the two webs pass through.

While a number of creping and ply bonding adhesives have been disclosed and are suitable for their intended uses, no single adhesive or adhesive blend has provided a satisfactory combination of adhesive performance characteristics (i.e. insolubility, rewet, adhesion and hardness) on different creping machines. Thus, a continuing need exists for creping and ply bonding adhesives that overcome the above deficiencies and limitations.

BRIEF DESCRIPTION

It has been discovered by the inventor hereof that acidified polyamidoamines in various embodiments are excellent creping and ply bond adhesives, used alone or in combination with epi-polyamides or when crosslinked with multivalent metal ions. Compositions are easily optimized for a range of adhesive properties.

In one embodiment, an adhesive for use in paper manufacturing comprises a cationic, non-crosslinked polyamidoamine having the linear repeating units

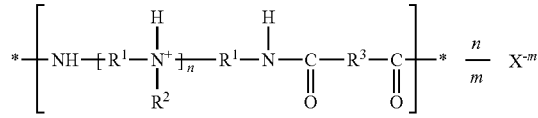

wherein $n \geq 1$; $m=1$ or $2$; $X^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate, or a combination comprising at least one of the foregoing anions; $R^1$ is a divalent aliphatic, cycloaliphatic, or araliphatic group having from 1 to 24 carbon atoms; $R^2$ is hydrogen or a monovalent aliphatic, cycloaliphatic, or araliphatic group having from 1 to 24 carbon atoms; and $R^3$ is a divalent $C_{2-12}$ hydrocarbon radical derived from a dibasic carboxylic acid.

In another embodiment a method of creping paper comprises applying to a rotating cylinder a polymer solution comprising 0.1 to 10 wt % of the above-described cationic non-crosslinked polyamidoamine in water, wherein the pH of the polymer solution is less than 6.9 prior to dilution; pressing the tissue paper web against the creping cylinder to effect adhesion of the tissue paper web to the surface of the cylinder; and dislodging the tissue paper web from the creping cylinder by contact with a doctor blade.

Another embodiment is a creped tissue produced by the process of applying to a rotating cylinder a polymer solution comprising 0.1 to 10 wt % of the above-described cationic non-crosslinked polyamidoamine in water, wherein the pH of the polymer solution prior to dilution is less than 6.9; pressing the tissue paper web against the creping cylinder to effect adhesion of the tissue paper web to the surface of the cylinder; and dislodging the tissue paper web from the creping cylinder by contact with a doctor blade.

In another embodiment, a multi-ply product comprises at least two plies, wherein the plies are bonded by an aqueous polymer solution comprising a cationic non-crosslinked polyamidoamine with the linear repeating units

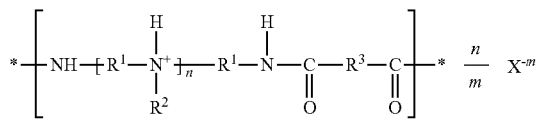

wherein $n \geq 1$; $m=1$ or $2$; $X^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate, or a combination comprising at least one of the foregoing anions; $R^1$ is a divalent aliphatic, cycloaliphatic, or araliphatic group having from 1 to 24 carbon atoms; $R^2$ is hydrogen or a monovalent aliphatic, cycloaliphatic, or araliphatic group having from 1 to 24 carbon atoms; and $R^3$ is a divalent hydrocarbon radical derived from a dibasic carboxylic acid. The product can be, for example, a napkin or a corrugated media.

The above described and other features are exemplified by the following FIGURE and detailed description.

BRIEF DESCRIPTION OF THE DRAWINGS

FIG. 1 is a schematic of a Yankee dryer system.

DETAILED DESCRIPTION

Disclosed herein are acidic aqueous polyamidoamine composition adhesive compositions, their method of manufacture, and methods of use related to paper tissue manufacturing. The compositions provide superior performance characteristics as creping adhesives and ply bonding agents.

In the first embodiment the adhesive comprises an acidified, cationic non-crosslinked polyamidoamine comprising repeating backbone units of the general structure GS-1.

GS-1

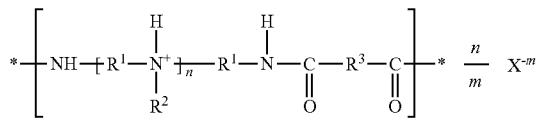

In formula GS-1, n is greater than or equal to 1. Specifically n has an average value of 1 to 4. Further, $m=1$ or $2$; $X^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate, or a combination comprising at least one of the foregoing anions; $R^1$ is a divalent aliphatic, cycloaliphatic, or araliphatic group having from 1 to 24 carbon atoms; $R^2$ is hydrogen or a monovalent aliphatic, cycloaliphatic, or araliphatic group having from 1 to 12 carbon atoms; and $R^3$ is a divalent hydrocarbon radical derived from a dibasic carboxylic acid having 2 to 24 carbon atoms.

Further in formula GS-1, $R^1$ is divalent aliphatic, cycloaliphatic, or araliphatic group having from 1 to 24 carbon atoms. More specifically, $R^1$ represents a $C_2$ to $C_8$ alkylene group; most specifically $R^1$ is a $C_2$-$C_3$ alkylene group. $R^2$ is hydrogen or a monovalent aliphatic, cycloaliphatic, or araliphatic group having from 1 to 12 carbon atoms. More specifically, $R^2$ is a $C_2$-$C_3$ alkyl group. Alternatively, $R^1$ and $R^2$ can also together form a ring having from 4 to 12 carbon atoms.

$R^3$ in formula GS-1 is a divalent hydrocarbon radical derived from a dibasic carboxylic acid having 2 to 24 carbon atoms. More specifically $R^3$ is an ethylene, propylene, butylene, pentylene, or hexylene group Further in formula GS-1, $X^{-m}$ represents an anion having a charge of $-1$ or $-2$. More specifically, m is 1 or 2, and $X^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate or a combination comprising one or more of the foregoing anions thereof; most specifically sulfate, bisulfate, tosylate, or combinations thereof.

The acidic aqueous polyamidoamine composition can be formed by reacting a dibasic carboxylic acid (or chemical equivalent thereof) with a polyamine comprising at least two primary amines and at least one secondary or tertiary amino group, to provide an alkaline aqueous solution of the polyamidoamine. The mole ratio of dibasic carboxylic acid to polyamine can vary widely. In one embodiment, the mole ratio of dicarboxylic acid to polyamine is from about 1:0.8 to 1:2.5, specifically from 1:0.8 to 1:1.4.

Suitable dibasic carboxylic acids include, for example, malonic, succinic, glutaric, adipic, pimelic, suberic, azelaic, sebacic, maleic, fumaric, itaconic, phthalic, isophthalic, or terephthalic acids. A combination comprising different acids can be used. Chemical equivalents of the acids include the corresponding $C_1$-$C_6$ alkyl esters of the dicarboxylic acids.

Suitable polyamines include $C_1$-$C_{24}$ aliphatic, cycloaliphatic, or araliphatic (specifically aliphatic) polyamines. More specifically, useful polyamines include aliphatic polyamines of low molecular weight having the general formula GS-2

GS-2

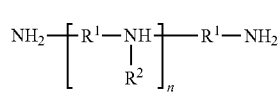

wherein $R^1$, $R^2$, and n have the same meaning as described above for GS-1. Such polyamines are readily formed in known manners that do not require the use of ethyleneimine as a starting material, as for example, by the reaction of an alpha, omega-dihaloalkane with ammonia. More specifically, GS-2 is diethylenetriamine or triethylenetetramine.

The alkaline aqueous polyamidoamine condensation product is then acidified with an acid to a pH of 1 to 6.9, specifically 2.5 to 6.0, and even more specifically pH 3.5 to 4.5. In another embodiment, the pH is adjusted to less than 5.0, specifically 3.8 to 5.0, more specifically 4.0 to 4.9. 51. Suitable acids for acidifying the alkaline polya: substituted alkyl or aryl carboxylic acids. In one embodiment, a Lewis acid can be sued, or a mineral acid, for example phosphoric acid, hydrochloric acid, or sulfuric acid, or an organic acid, for example acetic acid, citric acid, or formic acid.

Exemplary non-limiting acidic polyamidoamines include the following:

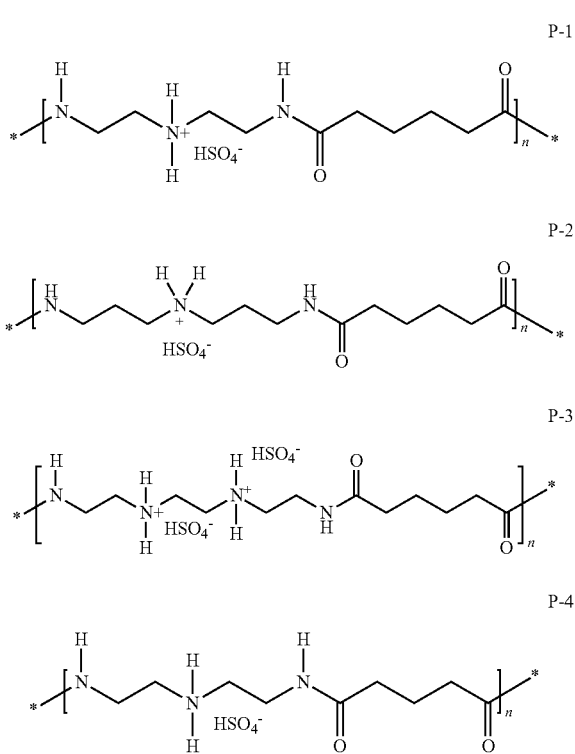

P-1

P-2

P-3

P-4

The neutral analog of P-1, designated NP-1 used in a comparative example, is an intermediate in the commercial manufacture of epi-polyamides.

The above-described polyamidoamines are water soluble. As used herein, the term "water soluble" refers to materials that are soluble in water to at least 3%, by weight at 25° C. The adhesives can accordingly be used at a wide range of solids content, for example 1 to 99 wt % solids, specifically 8 to 75 wt % solids.

The polyamidoamines compostions can be used with additives known in the paper making industry, for example monoammonium phosphate, a crepe release agent, polyvinyl alcohol, and/or a plasticizer, for example propylene glycol, diethylene glycol, triethylene glycol, dipropylene glycol, glycerol, or a mixture comprising at least one of the foregoing plasticizers.

The acidic aqueous polyamidoamine compositions are further useful because the properties of the adhesive formed from them, in particular solubility, hardness, rewet, and tack adhesion can be readily adjusted on-site to meet the needs of the particular process for which they are being used.

With respect to the parameters of insolubility, hardness, rewet, and tack adhesion, it is known that direct correlation exists between performance and the degree of crosslinking, shown in Table 1 for three crosslinking levels of epi-polyamide.

TABLE 1

| Crosslinked Epi-polyamide Adhesives Properties | | | |
|---|---|---|---|
| Property | Slight | Moderate | Heavy |
| Insolubility | Low (25-85%) | (85-94%) | (>94%) |
| Rewet** | None to low | Medium/high | Medium/low |
| Hardness* | Low/medium | Medium | High |
| Tack adhesion | Medium/high | Medium | Medium/low |

For example, in the case of a slightly crosslinked adhesives the product's performance parameters are typically reflective as medium/high adhesion, low insolubility and low hardness.

Insolubility is a measure of the amount of the dry crepe adhesive remaining on the dryer surface after contact with a high moisture sheet. The percent insolubility is determined by the weight of an undissolved adhesive film divided by the initial dry film weight.

Hardness is a measure of the ability to penetrate the adhesive film using such test methods as pencil scratch test or a Durometer Hardness tests. In creping operations, this is best demonstrated as the sheet is creped at the blade. A fine layer of the base coating remains on the dryer surface after the sheet has left the dryer.

The term "rewet" has been used in the industry in two ways. Herein, rewet is the ability of a dried film to reabsorb water, swell, soften, reacquire increased adhesion and still maintain minimum required insolubility for the desired creping sheet moisture conditions. "Good rewet" refers to a film that repeatedly rewets and can be redried. The rewet test determines the adhesive film's water uptake and is defined by the weight of the wet film over the weight of the dry film based at a specific time period. Non-crosslinked water-soluble polymers are generally poor rewetters because they rewet once and dissolve. They have none or poor insolubility, being easily washed away.

Tack adhesion is the total coating adhesion strength for maintaining the sheet to the dryer surface. There is an inverse relationship between hardness and a film's percent insolubility and adhesion. An increase in the adhesive's hardness reduces the adhesion. An optimum adhesive chemistry provides for an effective balance of hardness and adhesion. The degree in which the sheet adheres to the dryer surface at the point of contact at the crepe blade is largely based on the release to adhesive ratio.

Here, the properties of the acidic aqueous polyamidoamine compositions can be adjusted by additives such as a crosslinking agent, other known adhesives, and bonding agents. Such additives are readily combinable by the end user of the compositions on site, thereby obviating the need for maintaining an inventory of a multiplicity of compositions designed for different use conditions.

Thus, in a one embodiment, the composition comprises an acidified aqueous polyamidoamine of formula GS-1 crosslinked using a multivalent metal ion. The metal ion has at least a valence of 2 and specifically a valence of 3 or more. The multivalent metal ion can also have a coordination number of at least two and specifically a coordination number of four or greater. Suitable multivalent metal ions are include, for example, Lewis acids such as aluminum, calcium, strontium, barium, titanium, chromium, manganese, iron, cobalt, nickel, zinc, molybdenum, tin, antimony, niobium, vanadium, tungsten, hafnium, zirconium, and the like. A combination comprising at least one of the foregoing ions can also be used. A species comprising the metal ion can be used to acidify the polyamidoamine, as well as crosslink the polyamidoamine.

The metal ion or combination of metal ions forms chelates with the amine sites on the acidified polyamidoamine resin. The particular metal ion and the concentration of metal ion are adjusted to vary the properties of the resulting resin such as insolubility, rewetability, crosslink density, hardness, and tack. In general, as the concentration of metal ion increases, the insolubility, rewetability, crosslink density, and hardness increase, and the adhesive properties decrease. The ability to control these physical properties allows the operator to precisely control the desired properties of the creping adhesive or ply bonding material. In effect, the operator can "dial in" the desired creping properties by varying the metal ion concentration, without resorting to known crosslinked epi-polyamide materials. In general, a useful metal ion content is 0.1 to 5.0 wt % of the, more specifically 1.0 to 4.0 wt %, based on the total weight of the metal ion and the dry polymer.

In another embodiment, acidified aqueous polyamidoamine and an epi-polyamide are blended together to provide for tunable adhesion and insolubility properties.

A suitable epi-polyamide is a water-soluble, thermosetting, cationic epi-polyamide formed by the reaction a polyamidoamine, either acidic or neutral, with an epihalohydrin, for example epichlorohydrin at a mole ratio of epihalohydrin to reactive amine sites in the polyamidoamine from about 0.05 to 1 to about 2 to 1. Acid is added before or after the epihalohydrin in order to stabilize or retard the crosslinking reaction, thus preventing irreversible gelation while in storage. The resulting solution comprises a water-soluble, thermosetting, cationic epi-polyamide resin. Exemplary methods for the preparation of the water-soluble, thermosetting, cationic epi-polyamide resins is described by Keim in U.S. Pat. No. 2,926,116, U.S. Pat. No. 3,058,873 and U.S. Pat. No. 3,772,076.

Specific epi-polyamides useful herein are sold under the tradenames OmniCrepe™ 681-A, OmniCrepe™ 681 AM, and OmniCrepe™ 681 AX by Kemira. Other commercial suppliers of epi-polyamide resins include Hercules Inc. of Wilmington, Del., Kemira of Birmingham, Ala., and Georgia-Pacific Corp. of Atlanta, Ga. These resins are supplied as a concentrated solution in water.

Thermosetting cationic epi-polyamides are compatible when blended in any weight ratio with acidic aqueous compostions comprising the polyamidoamines represented by GS-1, particularly P-1. Percent insolubility and adhesion properties are tunable to specific application requirements by varying the weight ratios in the blend. Weight ratios of epi-polyamide to polyamidoamine can vary from 99:1 up to 1:99.

The acidic polyamidoamine compostions are especially useful in tissue paper and other paper making processes. As used herein, the terms "tissue paper web, paper web, web, paper sheet and paper product" all refer to sheets of paper made by a process comprising the steps of forming an aqueous papermaking furnish, depositing this furnish on a foraminous surface, such as a Fourdrinier wire, and removing the water from the furnish as by gravity or vacuum-assisted drainage, with or without pressing, and by evaporation, comprising the final steps of adhering the sheet in a semi-dry condition to the surface of a Yankee dryer, completing the water removal by evaporation to an essentially dry state, removal of the web from the Yankee dryer by means of a flexible creping blade, and winding the resultant sheet onto a reel.

The terms "multi-layered tissue paper web, multi-layered paper web, multi-layered web, multi-layered paper sheet and multi-layered paper product" are all used interchangeably in the art to refer to sheets of paper prepared from two or more layers of aqueous paper making furnish which are preferably comprised of different fiber types, the fibers typically being relatively long softwood and relatively short hardwood fibers as used in tissue paper making. The layers are preferably formed from the deposition of separate streams of dilute fiber slurries upon one or more endless foraminous surfaces. If the individual layers are initially formed on separate foraminous surfaces, the layers can be subsequently combined when wet to form a multi-layered tissue paper web.

The term "single-ply tissue product" means that it is comprised of one ply of creped tissue; the ply can be substantially homogenous in nature or it can be a multi-layered tissue paper web. As used herein, the term "multi-ply tissue product" means that it is comprised of more than one ply of creped tissue. The plies of a multi-ply tissue product can be substantially homogenous in nature of they can be multi-layered tissue paper webs. It is to be understood that although the description below refers to "tissue" products, the compositions, methods, and procedures herein are also applicable to other multi-ply products, for example corrugated media.

A process for creping tissue paper using the above-described compositions comprises: applying to a rotating creping cylinder an aqueous solution comprising from about 90% to about 99.9% water and from about 10% to about 0.1% adhesive solids, wherein said solids comprise the acidified aqueous polyamidoamine; pressing a tissue paper web against the creping cylinder to effect adhesion of the web to the surface of the cylinder; and dislodging the web from the creping cylinder by contact with a doctor blade.

The total amount of applied creping adhesive is from about 0.1 lb/ton to about 10 lb/ton based on the dry weight of the creping adhesive and the dry weight of the paper web. The unit lb/ton, as used herein, refers to the dry amount of creping adhesive measured in lbs. relative to the dry amount of paper measured in tons.

The tissue web can be comprised of various types of natural and recycled fibers including wood pulps of chemical and mechanical types. The fibers can comprise hardwood, softwood and cotton fibers. The tissue web can also contain particulate fillers, fines, ash, organic contaminates such as the cellophane from envelope windows, adhesives such as PVA-styrene-butadiene and inks as well as process chemicals used in the paper-making process such as strength additives, softeners, surfactants and organic polymers.

FIG. 1 illustrates the conventional steps in formation of a tissue paper web. This conventional process includes the steps of performing a fibrous web, applying a creping adhesive to the surface of a Yankee dryer, applying the fibrous web to the surface of the Yankee dryer having the creping adhesive on the external surface thereof, removing the fibrous web from the Yankee dryer by use of a creping blade and winding the dried fibrous web onto a roll. Alternatively, the creping adhesive can be applied to the surface of the fibrous web that will contact the dryer, before the fibrous web is presented to the dryer.

Referring to FIG. 1, this represents one of a number of possible configurations used in processing tissue products. In this particular arrangement, the transfer and impression fabric designated at 10 carries the formed, traveling web 12 around turning roll 20 to the nip between press roll 14 and Yankee dryer 22. The fabric, web, and dryer move in the directions indicated by the arrows. The entry of the web to the dryer is well around the roll from creping blade 16 which, as schematically indicated, crepes the traveling web from the Yankee dryer 22 as indicated at 24. The creped web 24 exiting from the dryer is wound into a soft creped tissue roll 18. To adhere the traveling web 12 to the surface of the Yankee dryer 22, a spray 26 of adhesive is applied to the surface ahead of the nip between the press roll 14 and Yankee dryer 22. Alternately, the spray may be applied to the traveling web 12 directly as shown at 28.

This illustration does not incorporate all the possible configurations used in presenting a web to a Yankee dryer. It is used only to describe how the adhesive of the present invention can be used to promote adhesion and thereby influence the crepe of the product. The present invention can be used with all other known processes that rely upon creping the web from a dryer surface. In the same manner, the method of application of the adhesive to the surface of the dryer or the web is not restricted to spray applications, although these are generally the simplest method for adhesive application.

In another embodiment, a process for creping tissue paper comprises: applying to a rotating creping cylinder an aqueous solution comprising from about 90% to about 99.9% water and from about 10% to about 0.1% adhesive solids, wherein the solids comprise a water dispersible, acidified polyamidoamine and a multi-valent metal ion salt; pressing a tissue paper web against the creping cylinder to effect adhesion of the web to the surface of the cylinder; and dislodging the web from the creping cylinder by contact with a doctor blade.

In another embodiment, a process for creping tissue paper comprises: applying to a rotating creping cylinder an aqueous solution comprising from about 90% to about 99.9% water and from about 10% to about 0.1% adhesive solids, wherein said solids comprise a water dispersible blend of cationic non-crosslinked polyamidoamine and a epi-polyamide material; pressing a tissue paper web against the creping cylinder to effect adhesion of the web to the surface of the cylinder; and dislodging the web from the creping cylinder by contact with a doctor blade.

The herein described compositions are also advantaged as ply bond adhesives. In these embodiments, the plies can optionally have a plurality of embossments protruding outwardly from the plane of the ply towards an adjacent ply. The adjacent ply likewise may have opposing protuberances protruding towards the first ply. If a three ply paper product is desired, the central ply may have embossments extending outwardly in both directions, although a central ply having no embossments or unidirectional embossments may be feasible.

Each ply may have a basis weight of about 8 to 30, and preferably 11 to 18 pounds per 3,000 square feet, and preferably has a composition of hardwood and/or softwood processed by any of the means well known in the art. After the papermaking process which forms the ply is complete, either or both plies may be embossed. Embossing may be accomplished according to the knob-to-knob embossing process illustrated by U.S. Pat. No. 3,414,459, issued Dec. 3, 1968 to Wells; the nested embossing process illustrated in U.S. Pat. No. 3,556,907, issued Jan. 19, 1971 to Nystrand; or a dual ply process illustrated in U.S. Pat. No. 5,294,475, issued Mar. 15, 1994 to McNeil.

For the embodiments described and claimed herein, the embossments are spaced on a pitch of 0.05 to 0.70 inches and have an area at the distal end ranging from 0.001 to 0.100 square inches. Each embossment can be made on a roll having knobs protruding 0 to 0.120 inches from the plane of the roll. The embossments can be round, oval shaped, or irregularly shaped.

The plies are preferably adhesively bonded together. In one embodiment a suitable ply bond adhesive utilizes a solution of acidic polyamidoamine. In another embodiment a ply adhesive comprises an acidic polyamidoamine crosslinked with a multi-valent metal ion. In another embodiment a suitable ply bond adhesive comprises a blend of acidic polyamidoamine and a thermosetting cationic epi-polyamide resin. These embodiments generally utilize compositions described herein for creping applications, tailored specifically in % solids, viscosity, and blend ratio for specific ply bond applications The ply bond adhesive can be provided in a 2 to 25% aqueous solution (i.e., 2 to 25 percent solids and 98 to 75 percent water), specifically a 5 to 11 percent aqueous solution (i.e., 5 to 11 percent solids and 89 to 95 percent water), and specifically about a 5 to 8 percent aqueous solution (i.e., 5 to 8 percent solids and 92 to 95 percent water). In blended compositions, at least one percent of the total solution comprises a thermosetting cationic epi-polyamide resin. All solution percentages are by weight.

The ply bond adhesive is applied to a ply at a total solids quantity of 3 to 85 grams per 3,000 square feet, preferably 4 to 48 grams per 3,000 square feet, and more preferably 6 to 20 grams per 3,000 square feet. For a ply bond adhesive composition having a constant total solids, as the amount of thermosetting cationic epi-polyamide resin making up the constant total solids increases, generally a lesser quantity of the ply bond adhesive composition is applied to the ply.

A three-roll ply adhesive application system can be used to apply the adhesive. Using this system, the ply bond adhesive is picked up as a film on the surface of a pickup roll. The ply bond adhesive film is then split in the nip between the pickup roll and a metering roll. The portion of the film remaining on the metering roll then transfers to an applicator roll where the adhesive film is again split. The film remaining on the applicator roll is applied to the embossments of the ply. The embossments of this ply are then brought in contact with another ply. The plies are adhesively bonded together in the nip of conventional marrying rolls.

Of course, the ply bond adhesive may be applied to the embossments in any other manner as are well known in the art and is commonly used for nested or knob-to-knob embossing processes as well. Suitable application systems include flexographic, spray systems, gravure systems, as well as the three-roll system described above.

As the spacing and size of the protuberance decreases, a greater amount of ply bond adhesive may be applied to each protuberance for the embodiment described. The amount of ply bond adhesive may be increased either by using a relatively greater solids content in the ply bond adhesive composition, or by applying a larger quantity of the ply bond adhesive composition to the ply.

The resulting paper product comprises a laminate of two or more plies. The paper product has a wet ply bond strength of at least 4.5 grams per inch, and more preferably at least 5.0 grams per inch.

The paper product further has alkaline wet ply bond strength of at least 4.5, and more preferably at least 5.0 grams per inch. Alkaline wet ply bond strength provides the benefit that if the paper product according to the present invention is used with certain commercially available cleaning products, the plies will remain joined together as a unitary laminate.

The resulting paper product also has a dry ply bond strength of 4.0 to 20.0 grams per inch, and more preferably 5.0 to 15.0 grams per inch.

The creping and ply bond adhesive compositions described herein are advantageous in a number of respects. They provide high adhesion; they are completely water soluble and repulpable; they do not plug the shower and are easily washed up; there are no heating or make down dilution issues; they provide a lower cost alternative to stocking multiple adhesive or ply bond formulations for different applications; and they provide control of sheet penetration (by easily adjusting solids, viscosity and % insolubility).

The following non-limiting examples illustrate advantages of acidic polyamidoamines set forth above. The examples are presented for illustrative purposes only and are not intended to limit the scope of the herein claimed compositions and processes.

EXAMPLES

Example 1

Preparation of Acidic Polyamidoamine, P-1

Polymer P-1 is produced via condensation polymerization of a 1:1 molar ratio of diethylenetriamine (DETA) and adipic acid. The reaction is conducted neat; no diluents are initially added. The reaction is immediate and exothermic upon addition of the adipic acid to the DETA. Addition of the adipic acid is carried out rapidly enough to ensure that the total charge is finished before the exotherm reaches 100° C. The reaction temperature is raised to 180° C. after the exotherm to drive the polymerization to the desired molecular weight range, the endpoint of which is determined by the collection of condensate water. This material (22.85 g, 70% solids) is diluted with 77.72 g water and acidified by slow addition of 2.17 g concentrated sulfuric acid ($H_2SO_4$) to a final pH of 4.4, Mw 20,000 Daltons, and a Brookfield LVT viscosity of 308 centipoise.

Example 2

Mixtures of P-1 and Epi-Polyamides of Varying Crosslink Density

The product of Example 1 was blended individually with several epi-polyamides commercially available under the tradenames OmniCrepe™ 681-A (designated XP-1), OmniCrepe™-AM (designated XP-2), and OmniCrepe™-AX (designated XP-3), by Kemira North America. These epi-polyamides are derived from the polymerization product of adipic acid and diethylenetriamine, and subsequently treated with epichlorohydrin and sulfuric acid. OmniCrepe™ products are classified as having medium through medium-heavy crosslinked density. OmniCrepe™ 681-A has the lowest crosslink density, the highest adhesion, the lowest insolubility, and the lowest hardness. OmniCrepe™-AM has an intermediate crosslink density level. OmniCrepe™-AX has highest crosslink density, the lowest adhesion, the highest insolubility, and highest hardness.

Table 1 compares the advantageous properties of acidic polyamidoamine, P-1, to its neutral analog, NP-1. P-1 is more suitable for creping and ply bonding applications because it has high tack (high adhesion) and is easily dissolved.

TABLE 1

| | | Properties Testing | | | | |
|---|---|---|---|---|---|---|
| | Description | Insolubility % | Rewet 5 min | Hardness | Tack grams | Dry Film Appearance |
| COMP-1 | NP-1 | 0% | 0 | | N/A | No to low tack, Brittle, Chips |
| INV-1 | P-1 | 0% | 0 | 20 | 12,500 | Very tacky, no form |

Table 2 illustrates the advantages of blending P-1 with epi-polyamides XP-1 and XP-3 as a means of tuning tack (adhesion) and insolubility. The blend P-1:XP-3 1:1, NV-2, has higher tack than each of the individual comparison epi-polyamides alone (COMP-2, COMP-3 and COMP-4), while providing acceptable insolubility (43%), rewet and hardness. The blend P-1:XP-1 1:3, NV-3, provides even higher tack and higher insolubility (91%) than the comparison examples.

TABLE 2

| | | Properties Testing | | | | |
|---|---|---|---|---|---|---|
| | Description | Insolubility % | Rewet 5 min | Hardness | Tack grams | Dry Film Appearance |
| COMP-2 | XP-1 | 86% | 3.2 | | 1,830 | Tack, form |
| COMP-3 | XP-2 | 90% | 2.2 | 62 | 2,260 | Tack, form |
| COMP-4 | XP-3 | 90% | 2.2 | 84 | 600 | Slight tack, form |
| INV-2 | P-1:XP-3, 1:1 | 43% | 0.6 | 24 | 6,000 | Tacky, form |
| INV-3 | P-1:XP-1, 1:3 | 91% | 2.3 | | 8,823 | Tacky, form |

Example 3

This example demonstrates tunable rewet and % insolubility properties using a metal ion to crosslink acidic polyamidoamine, P-1. To a solution of P-1 was added zirconium acetate at 2, 4, 6, and 12 wt % metal ion relative to total solids. The resulting chelated polymer progressively increased % insolubility and rewet properties with increasing concentration of metal ion, as shown in Table 3.

TABLE 3

| Metal ion, (wt %) | % Insolubility | Rewet (wet wt/init. Wt) |
|---|---|---|
| 0 | 0 | 0 |
| 2 | 6.6 | 0.10 |
| 4 | 10.0 | 0.16 |
| 6 | 17.0 | 0.25 |
| 12 | 39.0 | 0.58 |

The various embodiments described above provide for a creping and ply bond adhesive compositions having tunable combinations of insolubility, adhesion, rewet and hardness properties.

The singular forms "a," "an," and "the" include plural referents unless the context clearly dictates otherwise. The endpoints of all ranges directed to the same characteristic or component are independently combinable and inclusive of the recited endpoint. All patents cited herein are incorporated by reference in their entirety.

While the invention has been described with reference to several embodiments thereof, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A method of creping paper, comprising:
applying to a rotating cylinder a polymer solution, wherein the polymer solution is a mixture consisting of 0.1 to 10 wt % of a cationic non-crosslinked polyamidoamine and water, wherein the cationic non-crosslinked polyamidoamine is free of epihalohydrin, and wherein the mixture has a pH of less than 6.9;
pressing a tissue paper web against the rotating cylinder to effect adhesion of the tissue paper web to a surface of the cylinder using the cationic non-crosslinked polyamidoamine; and
dislodging the tissue paper web from the rotating cylinder by contact with a doctor blade to form the creping paper.

2. The method of claim 1, wherein the cationic non-crosslinked polyamidoamine has linear repeating units of:

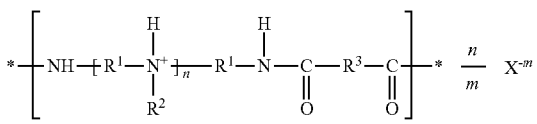

wherein $n \geq 1$; $m=1$ or $2$; $k^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate, or a combination comprising at least one of the foregoing anions; $R^1$ is a divalent aliphatic, cycloaliphatic, or araliphatic group having from 1 to 24 carbon atoms; $R^2$ is hydrogen or a monovalent aliphatic, cycloaliphatic, or araliphatic group having from 1 to 24 carbon atoms; and $R^3$ is a divalent hydrocarbon radical derived from a dibasic carboxylic acid.

3. The method of claim 2, wherein $n=1$, $k^{-m}$ is bisulfate, $R^1$ is ethylene, $R^2$ is hydrogen, and $R^3$ is butylene.

4. A method of creping paper, comprising:
spraying to a rotating cylinder a polymer solution, wherein the polymer solution is a mixture consisting of: 0.1 to 10 wt % of a cationic non-crosslinked polyamidoamine and water, wherein the mixture has a pH of less than 6.9, and wherein the polymer solution is free of epi-polyamide and epihalohydrin;
pressing a tissue paper web against the rotating cylinder to effect adhesion of the tissue paper web to a surface of the cylinder using the cationic non-crosslinked polyamidoamine; and
dislodging the tissue paper web from the rotating cylinder by contact with a doctor blade to form the creping paper.

5. The method of claim 4, wherein the cationic non-crosslinked polyamidoamine has linear repeating units of:

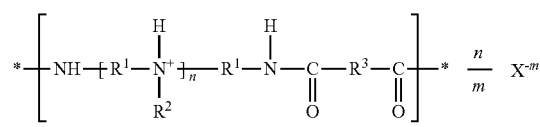

wherein $n \geq 1$; $m=1$ or $2$; $k^{-m}$ is chloride, bromide, iodide, sulfate, bisulfate, nitrate, oxalate, alkyl carboxylate, aryl carboxylate, hydrogen phosphate, dihydrogen phosphate, alkyl sulfonate, aryl sulfonate, or a combination comprising at least one of the foregoing anions; $R^1$ is a divalent aliphatic, cycloaliphatic, or araliphatic group having from 1 to 24 carbon atoms; $R^2$ is hydrogen or a monovalent aliphatic, cycloaliphatic, or araliphatic group having from 1 to 24 carbon atoms; and $R^3$ is a divalent hydrocarbon radical derived from a dibasic carboxylic acid.

6. The method of claim 5, wherein $n=1$, $k^{-m}$ is bisulfate, $R^1$ is ethylene, $R^2$ is hydrogen, and $R^3$ is butylene.

* * * * *